(12) United States Patent
Döragrip

(10) Patent No.: US 6,324,721 B2
(45) Date of Patent: Dec. 4, 2001

(54) LEAF BLOWER

(75) Inventor: Gustaf Döragrip, Jönköping (SE)

(73) Assignee: Aktiebolaget Electrolux, Stockholm (SE)

( * ) Notice: Subject to any disclaimer, the term of this patent is extended or adjusted under 35 U.S.C. 154(b) by 0 days.

(21) Appl. No.: 09/727,602

(22) Filed: Dec. 1, 2000

(30) Foreign Application Priority Data

Dec. 3, 1999 (SE) .................................................... 9904402

(51) Int. Cl.⁷ ........................................................ A47L 9/00
(52) U.S. Cl. ................................. 15/326; 15/405; 15/413
(58) Field of Search ............................. 15/405, 413, 326

(56) References Cited

U.S. PATENT DOCUMENTS

| | | | |
|---|---|---|---|
| 4,461,055 | * 7/1984 | Zerrer et al. | ............ 15/413 X |
| 4,663,799 | * 5/1987 | Kiyooka | ............ 15/405 X |
| 4,884,314 | * 12/1989 | Miner et al. | ............ 15/413 X |
| 5,457,846 | 10/1995 | Kuwano et al. . | |
| 5,802,133 | 9/1998 | Iida . | |

* cited by examiner

Primary Examiner—Chris K. Moore
(74) Attorney, Agent, or Firm—Pearne & Gordon LLP

(57) ABSTRACT

A portable leaf blower having a fan unit (10) with a fan (11) and a combustion engine (12) for driving the fan. The fan unit (10) is arranged in a shell (16,17) provided with a lower inlet opening (23) through which air, during operation, flows to the fan (11). The shell is further provided with an upper opening (24). When the engine (12) has been cut off, air for cooling the engine (12) flows through the shell (16,17) by means of self convection from the lower inlet opening (23) to the upper opening (24).

11 Claims, 1 Drawing Sheet

LEAF BLOWER

BACKGROUND OF THE INVENTION

1. Field of the Invention

The present invention relates to a portable leaf blower having a fan unit with a fan and a combustion engine for driving the fan.

2. Description of the Related Art

Engine driven leaf blowers have turned out to be efficient tools for cleaning lawns, pedestrian streets, parking places and the like. Such leaf blowers, however, have the disadvantage that they create a comparatively high noise level that is disturbing for the operator as well as for the environment. For instance, the fan creates noise of such a character that it penetrates walls and closed windows and, hence, is difficult to shut out. For this reason in some areas restrictions have been introduced limiting the use of such motor driven tools. There also are limits for maximum allowable noise level that the currently-used leaf blowers do not fulfil.

Another problem in connection with leaf blowers is that they are often exposed to rough treatment especially under transport, which means that damages might occur for example, to the air filter, carburetor or fuel tank.

SUMMARY OF THE INVENTION

A purpose of the present invention is to minimize or eliminate the aforementioned inconveniences that are found in the prior art, and to achieve a leaf blower which, when compared to such prior-art tools, emits less disturbing noise and also stands rough treatment without the risk for damages. In accordance with the present invention, a leaf blower has a fan unit arranged in a shell, the shell having a lower inlet opening and an upper opening. When the engine and fan are operating, air flows through the lower inlet opening to the fan. When the engine and fan are shut off, air for cooling the engine flows through the shell, from the lower inlet opening to the upper inlet opening, by means of self convection, thereby cooling the engine.

BRIEF DESCRIPTION OF THE DRAWINGS

These and further features of the present invention will be apparent with reference to the following description and drawings, wherein.

DETAILED DESCRIPTION OF THE PREFERRED EMBODIMENT

Figure 2:
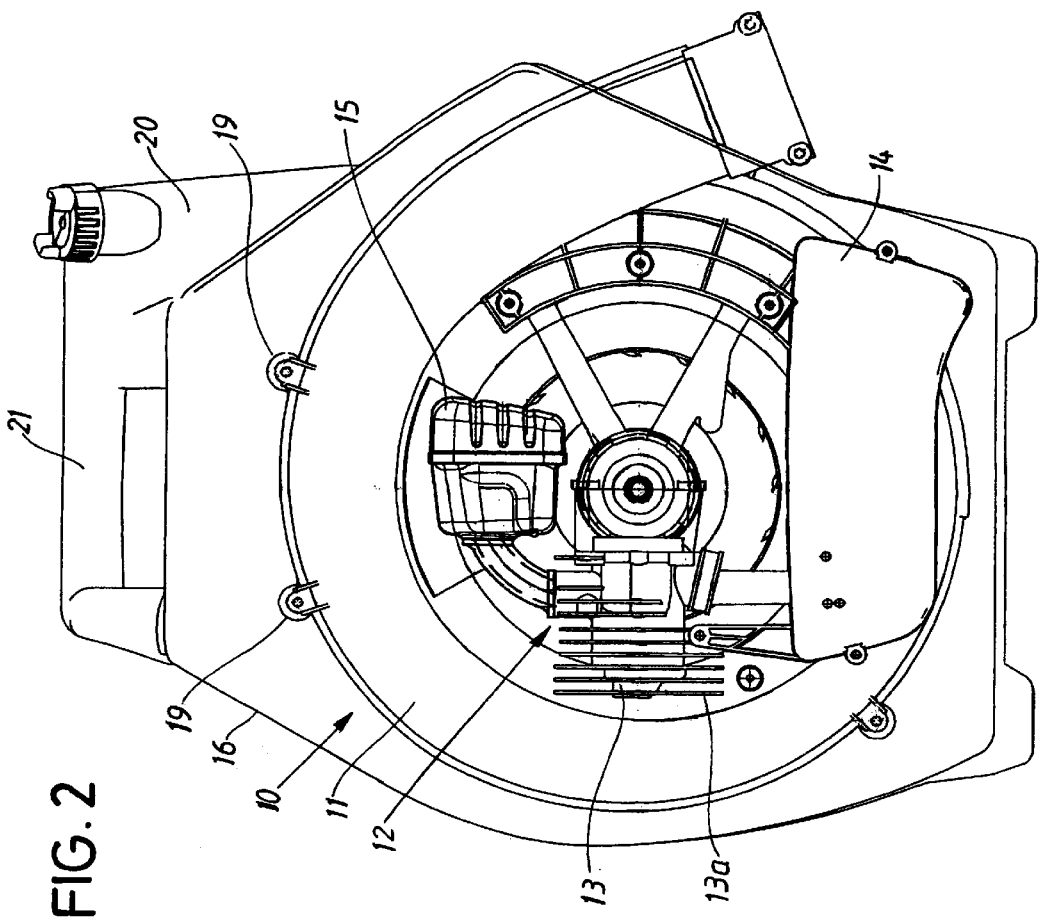

The leaf blower shown in the drawing has a portable, motor-driven fan unit 10 comprising a centrifugal fan 11 that is driven by a combustion engine 12. As is best shown in FIG. 2, the engine 12 is provided with a cylinder 13, a carburetor housing 14 and silencer or muffler 15.

The fan unit 10 is arranged in a shell consisting of a bottom part 16 provided with a removable cover 17. A dividing or separation line between the bottom part 16 and the cover 17 is shown with dotted lines 18 in FIG. 1. In order to more clearly show the fan unit 10, the leaf blower is illustrated in FIG. 2 with the cover 17 removed. The fan unit 10 is, by spring means that damp the vibrations, supported at the bottom part 16. Accordingly, the bottom part 16 serves as a chassis for the fan unit 10.

The bottom part 16 is, at its upper end, provided with a fuel tank 20 and a supporting handle 21. The fan unit is arranged to be supported on the back of an operator and for this purpose the bottom part 16 is provided with supporting belts (not shown). The cover 17 is removably secured at the bottom part 16 by means of fastening devices (not shown) of some suitable conventional type, which means that the fan unit 10 is easily accessible for maintenance and repair. At its inside the cover 17 is provided with a noise insulating and noise absorbing material 22.

Figure 1:
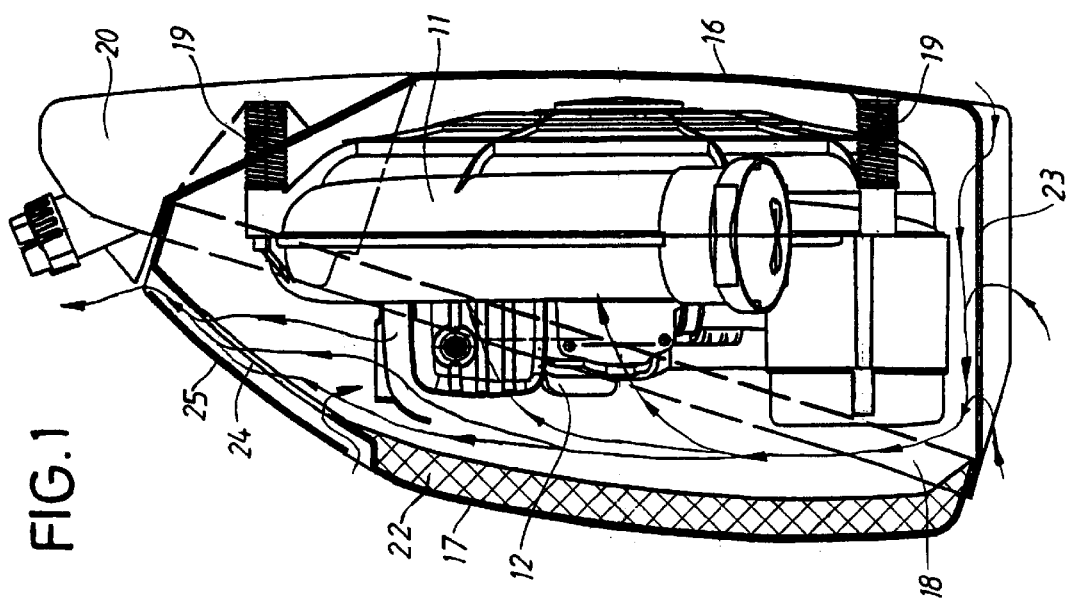
FIG. 1 is a side view, partly in section, of the leaf blower according to the present invention; and, FIG. 2 is a front view of the leaf blower shown in FIG. 1.

As shown in FIG. 1, a lower end of the bottom part 16 has an inlet opening 23 through which air flows into the fan 11 when the fan is operating. The air flow to the fan 11 also gives the necessary cooling of the engine 12 and especially the cylinder 13.

An upper end of the cover 17 has an opening 24 and a noise damping screen 25. The noise damping screen 25 is arranged outside and spaced a distance from the opening 23. The upper opening 24 is designed and provided to admit an air flow through the shell 16, 17 when the engine has been shut off in order to cool the hot parts of the engine, especially the cylinder 13 and the muffler 15. The air flow through the shell 16, 17 is created by means of self convection whereby air, which has been heated up by the engine, rises upwards and flows out through the upper opening 24 at the same time as cold air is drawn in through the lower inlet opening 23.

In order to achieve a good cooling efficiency and flow of cooling air through the shell 16, 17 the cylinder 13 of the engine is arranged horizontally and provided with vertical cooling flanges 13a. The cooling air flows along the cooling flanges 13a (FIG. 2) as the cooling air traverses the interior of the shell 16, 17 from the lower inlet opening 23 to the upper opening 24. Since the cooling air flow is directed upwards, the carburetor housing 14, which is placed at a lower level than the warmer parts, will not be overheated when the engine has been shut off. The carburetor is disposed in the carburetor housing 14, which also serves as a shield to prevent warming up of the carburetor (not shown) as a result of heat radiation from the warmer parts of the engine.

In FIG. 1 the air flow direction to the fan 11 during operation and the cooling air flow between the lower inlet opening 23 and the upper opening 24 after the engine has been shut off is shown by arrows. During operation, the upper opening 24 can also serve as a secondary air inlet, which is indicated in FIG. 1. Because of the self convection effect that takes place when the engine has been shut off excessively high temperatures, which otherwise may damage the shell 16, 17 or the noise damping insulation 22, are avoided.

Thus, the shell 16, 17 makes it possible to achieve an effective noise reduction of the engine and the fan unit 10, especially if the shell is at its inside provided with noise absorbing and noise insulating material. The shell is also an efficient protection against damages of the fan unit caused by mechanical influence during transport and handling.

While the preferred embodiment of the present invention is shown and described herein, it is to be understood that the same is not so limited but shall cover and include any and all modifications thereof which fall within the purview of the invention.

What is claimed is:

1. A portable leaf blower comprising a fan unit (10) with a fan (11) and a combustion engine (12) for driving the fan, wherein the fan unit (10) is arranged in a shell (16,17), said shell having a lower inlet opening (23) and an upper opening (24), and wherein, during operation of the fan and engine air flows through the lower opening to the fan and, when the engine (12) has been cut off, air for cooling the engine flows through the shell (16,17) by means of self convection from the lower inlet opening (23) to the upper opening (24).

2. The leaf blower according to claim 1, wherein the engine (12) has a mainly horizontal cylinder (13) provided with vertical flanges (13a).

3. The leaf blower according to claim 2, wherein the engine (12) is provided with a carburetor housing (14) that is placed at a level that is lower than a level of warmer parts of the engine.

4. The leaf blower according to claim 2, wherein the shell comprises a removable cover (17) and bottom part (16), the fan unit (10) being fastened to the bottom part, which thereby forms a chassis for the fan unit (10), the shell preventing damage to the fan unit caused by mechanical influence during transport and handling.

5. The leaf blower according to claim 2, wherein an inside of the shell (16,17) is provided with a noise absorbing and noise insulating material (22).

6. The leaf blower according to claim 1, wherein the engine (12) is provided with a carburetor housing (14) that is placed at a level that is lower than a level of warmer parts of the engine.

7. The leaf blower according to claim 6 wherein the shell comprises a removable cover (17) and bottom part (16), the fan unit (10) being fastened to the bottom part, which thereby forms a chassis for the fan unit (10), the shell preventing damage to the fan unit caused by mechanical influence during transport and handling.

8. The leaf blower according to claim 6, wherein an inside of the shell (16,17) is provided with a noise absorbing and noise insulating material (22).

9. The leaf blower according to claim 1, wherein the shell comprises a removable cover (17) and bottom part (16), the fan unit (10) being fastened to the bottom part, which thereby forms a chassis for the fan unit (10), the shell preventing damage to the fan unit caused by mechanical influence during transport and handling.

10. The leaf blower according to claim 9, wherein an inside of the shell (16,17) is provided with a noise absorbing and noise insulating material (22).

11. The leaf blower according to claim 1, wherein an inside of the shell (16,17) is provided with a noise absorbing and noise insulating material (22).

* * * * *